United States Patent
Storm et al.

(10) Patent No.: US 8,254,365 B2
(45) Date of Patent: Aug. 28, 2012

(54) METHOD FOR MAINTAINING TIMING ACROSS DISCONTINUOUS ACTIVITY GAPS FOR A NON-REAL TIME DATA INTERFACE

(75) Inventors: Brian D Storm, Round Lake Beach, IL (US); Gregory W Chance, Round Lake Beach, IL (US)

(73) Assignee: Motorola Mobility LLC, Libertyville, IL (US)

( * ) Notice: Subject to any disclaimer, the term of this patent is extended or adjusted under 35 U.S.C. 154(b) by 938 days.

(21) Appl. No.: 12/326,278

(22) Filed: Dec. 2, 2008

(65) Prior Publication Data

US 2010/0135275 A1 Jun. 3, 2010

(51) Int. Cl.
 H04J 3/24 (2006.01)
 H04J 3/16 (2006.01)
 H04J 11/00 (2006.01)
 H04B 7/216 (2006.01)
(52) U.S. Cl. ......... 370/349; 370/468; 370/335; 370/209
(58) Field of Classification Search .................. 370/468, 370/335, 505, 209
 See application file for complete search history.

(56) References Cited

U.S. PATENT DOCUMENTS

2001/0046205 A1* 11/2001 Easton et al. ................. 370/209
2007/0019589 A1* 1/2007 Attar et al. .................... 370/335
2009/0022177 A1* 1/2009 Schuster et al. .............. 370/468

OTHER PUBLICATIONS

Digital Interface Working Group (Rapporteur: Andrew Fogg), "DigRF Baseband/RF Digital Interface Specification: Logical, Electrical and Timing Characteristics—EGPRS Version", Version 1.12, Feb. 20, 2004, 32 pages.
Infineon Technologies AG, "Smarti UE + PMB5704 Product Brief", 2008, 2 pages, Munich Germany.

* cited by examiner

Primary Examiner — Huy D Vu
Assistant Examiner — Kiet Tang
(74) Attorney, Agent, or Firm — Sylvia Chen

(57) ABSTRACT

A method for maintaining timing across discontinuous activity gaps for a non-real time data interface, in a radio frequency (RF) IC is disclosed. The method comprises starting a first receive mode in the RF IC to receive analog RF signals 210 in response to receiving a first command from a base band (BB) IC, converting the analog RF signals 215 into a first stream of digital data samples, and transmitting 225 the samples to the BB IC. Next, the RF IC stops the first receive mode 235 in response to receiving a second command from the BB IC and transmits 245 dummy data samples to the BB IC. Then the RF IC re-starts the first receive mode 275 in response to receiving a third command from the BB IC 270, converts analog RF signals received by the first receive mode into a second stream of digital data samples 285, and transmits the samples to the BB IC 298.

20 Claims, 6 Drawing Sheets

METHOD FOR MAINTAINING TIMING ACROSS DISCONTINUOUS ACTIVITY GAPS FOR A NON-REAL TIME DATA INTERFACE

FIELD OF THE DISCLOSURE

The present disclosure relates generally to non-real time data interfaces and, more particularly, to a technique for maintaining timing across discontinuous activity gaps for a non-real time data interface.

BACKGROUND

Non-real time data interfaces such as 3G DigRF interfaces provide direct communication between a base band (BB) IC and a radio frequency (RF) IC used in wireless communication devices. The RF IC is responsible for translating transmit data (digital baseband signals) supplied by the BB IC into analog RF signals for transmission through an antenna. The RF IC also converts incoming RF signals received by the antenna into a digital form suitable for processing by the BB IC. The BB IC is responsible for transmit data generation (such as voice), receive data demodulation, and its processing. A 3G DigRF interface, for example, is responsible for the transfer of signals between RF IC and BB IC.

Prior art FIG. 1 is a block diagram 100 of an RF IC in communication with a BB IC using a 3G DigRF interface. The RF IC 110 includes a dual-mode transmitter (2G/3G TX) 112, a dual-mode receiver (2G/3G RX) 114, a digital to analog converter (DAC) 120, an analog to digital converter (ADC) 122, a buffer 125 including a first RF RX buffer 124 for a first receive mode, a second RF RX buffer 126 for a second receive mode, and a 3G DigRF interface 130. The BB IC 150 includes a 3G DigRF interface 132, TX symbols I&Q signals 152, configuration and control signals 156, RX symbols I&Q signals 154, RF IC responses 158, a first BB RX buffer 155 for the first receive mode, a second BB RX buffer 157 for the second receive mode, a first modem 163, and a second modem 166. Additional buffers may be included, such as a BB TX buffer in the TX symbols I&Q signal path or an RF TX buffer preceding the DAC 120, but they are omitted here for the sake of simplicity.

In the example of FIG. 1, the RF IC 110 is capable of receiving and transmitting 3G (third generation, such as WCDMA) signals and 2G (second generation, such as GSM) signals.

The 2G/3G dual-mode RX 114 is responsible for receiving 3G signals from an external source such as an antenna (not shown) when configured in 3G mode and is responsible for receiving 2G signals from the same or different external source when configured in 2G mode. The ADC 122 converts these incoming analog RF signals from the 2G/3G dual-mode RX 114 at a sampling rate dependent on the active receiver's radio access technology (RAT) into a stream of digital data that can be transmitted to the BB IC 150. This stream of digital data samples is stored in an RF RX buffer 125 allowing samples to arrive at the RF sampling rate dictated by the ADC 122 and then be transmitted to the BB IC 150 from the RF RX buffers 124 or 126 at a different rate dictated by the 3G DigRF interface 130, 132 bit rate.

The RF IC 110 may route the digital data samples to one or more RF RX buffers based on the data type of the samples. In the example of FIG. 1, the first RF RX buffer 124 collects the stream of data samples associated with a 3G RAT (for example, WCDMA) and the second RF RX buffer 126 is used to collect the stream of data associated with a 2G RAT (for example, GSM RAT). Given that only a single receive path exists, only one of these buffers is utilized at a time to support the active receiver.

This stream of digital data samples is transmitted from the RF IC 110 to the BB IC 150 using the 3G DigRF interface 130, 132 and deposited in the active BB RX buffer 155 or 157 at a rate dictated by the 3G DigRF interface 130, 132 bit rate as each packet is received by the BB IC 150. The active BB RX buffer 155 or 157 is allowed to fill to a certain level before beginning to be read out at the RF IC 110 sample rate. After the active BB RX buffer 155 or 157 begins clocking out the received digital data samples to its respective modem 163 or 166, its output is clocked continuously which allows it to stay in synch with the sample stream being collected in the ADC 122.

On the transmit side, the same 3G DigRF interface 130, 132 is used by the RF IC 110 to receive digital signals from the BB IC 150. The DAC 120 converts the digital signals received from the BB IC 150 so that they can be transmitted by the 2G/3G dual-mode TX 112 of the RF IC 150. The digital signals received from the BB IC for transmission are generally modulated using an analog carrier signal (such as, a high-frequency sinusoid waveform). The 2G/3G dual-mode TX 112 is responsible for transmitting 2G or 3G signals using one or more antennas (not shown).

The BB IC 150 creates TX symbols using quadrature I&Q signals 152 and configuration and control signals 156 and receives RX symbols using quadrature I&Q signals 154 and RF IC responses 158 from the RF IC 110 using a 3G DigRF interface 130, 132. The TX symbol I&Q signals 152 contain the transmit data that has been processed by the BB IC 150 and will be transmitted to the RF IC 110. Conversely, the RX symbol I&Q signals 154 contain data that is received by the BB IC 150 from the RF IC 110.

All the configuration of the system and the control of the system are regulated by the BB IC 150. The BB IC 150 sends the configuration and control signals 156 to the RF IC 110 to initialize the required upcoming mode of operation and timing as required. The RF IC responses 158 are the information sent by the RF IC 110 to the BB IC 150, in response to the BB IC 150 requests for changes in configuration or status of the system.

The 3G DigRF interface 130, 132 helps the BB IC 150 and RF IC 110 to communicate with each other. The 3G DigRF interface 130, 132 combined with the RF RX 124, 126, and BB RX 155, 157 buffers allows asynchronous and dissimilar radio access technologies (for example, 2G and 3G) to share a common physical interface between the BB IC and the RF IC. The interface 130, 132 provides a transmission path (TX path) 160 for the transmission of control, data and timing from the BB IC 150 to the RF IC 110 and a reception path (RX path) 170 for receiving data by the BB IC 150 from the RF IC 110. The BB IC 150 is the keeper of the master clock and the timing between the RF IC 110 and the BB IC 150 clock is maintained by sending a timing strobe 180 from the BB IC 150 to the RF IC 110 over the 3G DigRF interface 130, 132. The timing strobe 180 from the BB IC 150 to the RF IC 110 is sent on the TX path 160. In one example, the timing strobe 180 is a signal embedded into the TX path 160 and sent over the 3G DigRF interface 130, 132.

In an example, where the RF IC 110 transmits a first RAT's data samples to the BB IC 150, the BB IC 150 transmits a timing strobe 180 to the RF IC 110 and the RF IC 110 starts transmitting samples associated with a first RAT to the BB IC 150. The ADC 122 begins converting the incoming analog RF signals from the 2G/3G dual-mode RX 114 into a stream of digital data. Then the ADC 122 fills the first RF RX buffer 124 with the stream of digital data that can be transmitted to the BB IC 150, at a predetermined time interval relative to the timing strobe 180 depending on the active RAT. When a full 3G DigRF packet worth of digital data samples are collected in the first RF RX buffer 124, the 3G DigRF interface 130 on the RF IC 110 transmits the packet to the 3G DigRF interface 132 on the BB IC 150, which then inserts the received digital data samples into the first BB RX buffer 155. After the first BB RX buffer 155 is filled to a programmable threshold, the digital data samples are read out of the first BB RX buffer 155 in a first in-first out manner at the original RF sample rate continuously and are fed to a first modem 163 until the first RAT receive activation is terminated. The programmable threshold is set such that, the bursty, asynchronous, and shared traffic aspects of the 3G DigRF interface would not result in the first BB RX buffer 155 running out of samples to deliver to the modem 163. In one example, the first modem 163 is a 3G modem and the second modem 166 is a 2G modem.

The RF IC 110 does not contain a sense of time and must rely entirely on the BB IC 150 to provide a timing reference in the form of a timing strobe 180. Despite the fact that the 3G DigRF interface 130, 132 is asynchronous with respect to the RF sample rate, the BB IC 150 can tolerate variation in the delay from when a sample is first taken at the ADC 122 to when it is read out of the first or second BB RX buffer 155,157 because the BB IC 150 begins by setting its timer to a known offset between when the RF IC 110 receives the timing strobe from the BB IC 150 and when the ADC 122 takes its first sample. The BB IC 150 holds its timer at this count until the first sample is read out of the first or second BB RX buffer 155, 157 making any variation in delay across the 3G DigRF interface 130, 132 irrelevant. This is true as long as the stream of digital data samples delivered from the RF IC 110 to the BB IC 150 continues uninterrupted at a rate fast enough to ensure no buffer underflows or overflows.

A problem arises when the data received on a particular RAT at the RF IC 110 is discontinuous such as when the RF IC 110 switches receive modes from one RAT to another RAT during a compressed mode gap. During the gap, the timer in the BB IC 150 which maintains timing with the network for the first RAT continues and cannot be stopped (as was required when the RX path 170 was initialized) without requiring a portion of the compressed mode gap to reacquire timing resulting from the time varying delay introduced by the 3G DigRF interface 130, 132. In addition, resending the timing strobe 180 will also contribute timing error, subsequently, increasing the timing uncertainty further. The process of re-establishing timing after the discontinuous activity gaps reduces a window of opportunity that may be used to monitor another RAT. The net effect is that more compressed mode gaps are required to accomplish the same task resulting in reduced call quality, increased time to detect suitable hand off candidates, and increased probability of a dropped call.

Accordingly, there is a need for maintaining timing across discontinuous activity gaps for a non-real time data interface.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
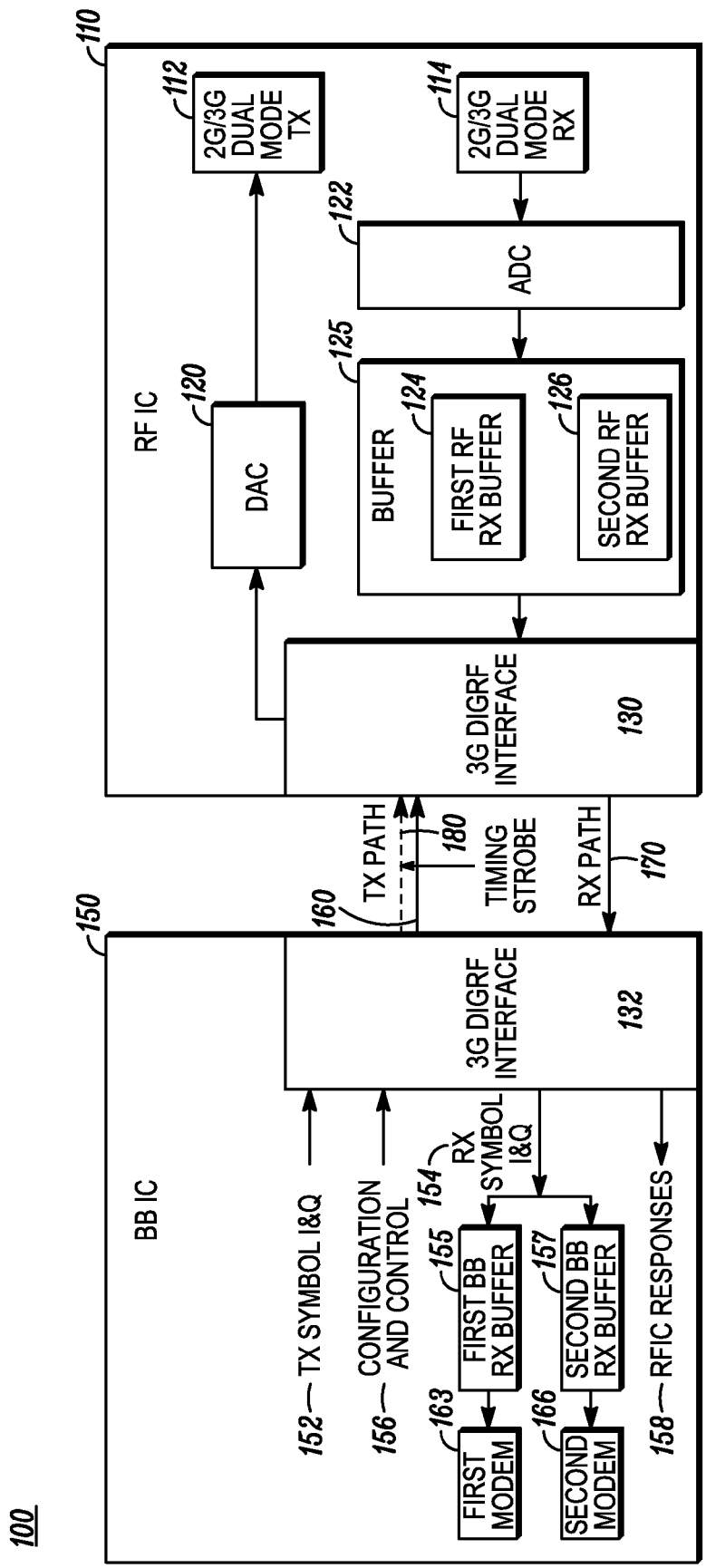
FIG. 1 is a block diagram of an RF IC in communication with a BB IC using a 3G DigRF interface.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method for maintaining timing across discontinuous activity gaps for a non-real time data interface maintains a first sample timing even when moving an ADC to another sample rate for a second RAT. The method places dummy data samples into the first RAT's data stream at the first ADC sample timing and rate and transmits them to the BB IC, when no actual data samples associated with the first RAT are actually available to the RF IC. When the receiver returns to the first RAT, the ADC sampling resumes at the original timing and the dummy data is succeeded by the first RAT's stream of non-dummy digital data samples. As a result, the RF IC sample timing does not have to be re-established because the RF IC always transmits samples, even when the RF IC is actually idle for the first RAT, and subsequently maintains timing relative to the BB IC.

Figure 2:
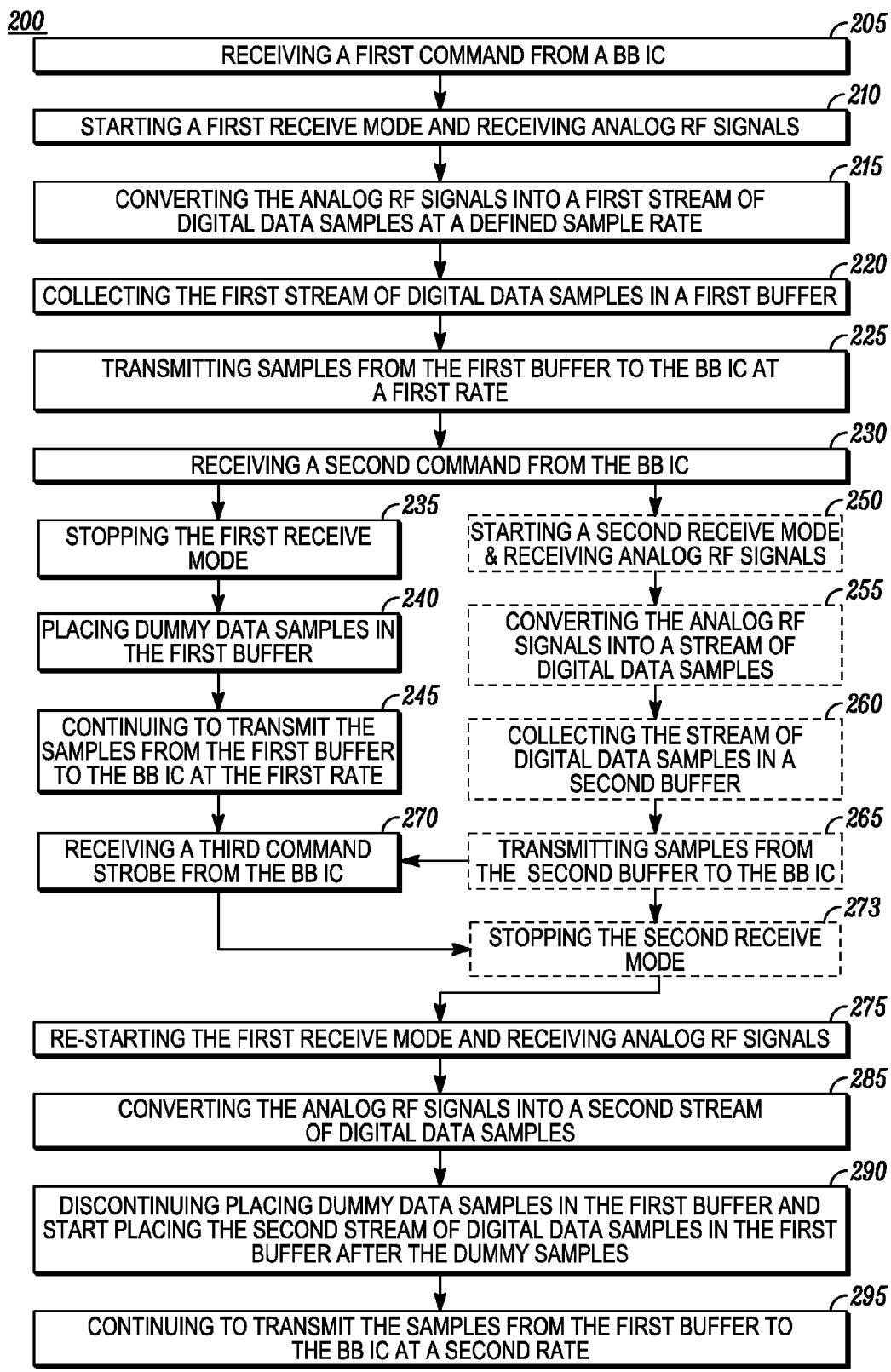
FIG. 2 is a flowchart of a method for an RF IC to maintain timing across discontinuous activity gaps in accordance with some embodiments.

FIG. 2 is a flowchart of a method 200 for an RF IC (such as RF IC 410 shown in FIG. 4) to maintain timing across discontinuous activity gaps. The method 200 starts with the RF IC receiving a first command from the BB IC 450. In one example, the first command may be a first timing strobe. In another example, the first command may be a number of commands.

In response to receiving the first command, the RF IC starts a first receive mode and subsequently starts receiving analog RF signals 210. In one example, the 2G/3G dual-mode RX 414 shown in FIG. 4 may be configured in a first receive mode for 3G receive and the associated analog RF signals may be 3G signals (for example, WCDMA signals). Then the RF IC converts the analog RF signals received by the first receive mode into a first stream of digital data samples at a defined sample rate 215.

After sampling the analog RF signals, the RF IC collects the first stream of digital data samples in a buffer 220. The RF IC places the initial digital sample of the first stream in the buffer, at a first predetermined time interval relative to the first command from step 205. Because the RF IC does not have a master clock, the RF IC performs its functions relative to the timing strobe received from the BB IC.

There may be different buffers for different signals (such as, a first buffer for 3G signals, a second buffer for 2G signals, and so on). In one example, these buffers may use a First In First Out (FIFO) scheme. In a FIFO scheme, the sample that is sent to the buffer first is the first sample to be transmitted from the buffer.

As the first stream of digital data samples is collected in the buffer, the RF IC starts transmitting 225 the samples from the buffer to the BB IC over a shared non-real time data interface (such as, the 3G DigRF interface 430, 432 shown in FIG. 4) at a first rate, as a transport mechanism is available. This first rate is different from the defined sample rate at which the RF IC sampled the analog RF signals in step 215. In one example, the RF IC may start transmitting from the buffer only after the buffer is filled to a threshold. This threshold may be defined by the user, the manufacturer of the RF IC, or the 3G DigRF interface packet size.

The BB IC begins receiving the samples from the RF IC and places them into a first buffer as they arrive, at a rate which is different from the defined sample rate at which the RF IC sampled the analog RF signals in step 215. There may be different buffers for different signals (such as, a first buffer for 3G signals, a second buffer for 2G signals, and so on). In one example, these buffers may use a First In First Out (FIFO) scheme. In a FIFO scheme, the sample that is sent to the buffer first is the first sample to be transmitted from the buffer.

When the number of samples in the buffer reaches a threshold, the BB IC begins sending the received samples from the buffer to the 3G modem at the defined sample rate at which the RF IC sampled the analog RF signals in step 215. This threshold may be defined by a manufacturer of the IC to ensure that the buffer does not under-flow or over-flow during normal operating conditions. While the input into this buffer may be bursty, the output is constant and continuous to keep the RF and BB IC's aligned in time.

While transmitting from the buffer, the RF IC may receive 230 a second command (for example, a second timing strobe) from the BB IC. The second command directs the receiver to stop the present receive operation while retaining timing for future resumption and to start receive operation on another RAT. In response to receiving the second command, the RF IC stops the first receive mode 235 while maintaining a sample timing reference and starts placing dummy data samples in the first buffer 240, after the first stream of non-dummy digital data samples. The RF IC continues to transmit 245 the samples from the first buffer to the BB IC at the first rate, as a transport mechanism is available. The dummy data samples comprise digital data having a NULL value. These dummy data samples are also taken at the same sample rate at which the analog RF signals were sampled into the first stream of digital data samples in step 215. In one example, the samples from the buffer are transmitted to the BB IC in the form of packets. Therefore, the dummy data samples may be transmitted to the BB IC in a dummy data packet. In one case, the dummy data packet may include a large number of dummy data samples. In another case, the dummy data packet may not include a number of dummy data samples but instead informs the BB IC to replace it with a pre-determined number of dummy data samples.

The dummy data samples are treated no differently when received in the BB IC and are placed into the first buffer as they are received. Likewise, the buffer continues to be emptied at the defined sampling rate. The modem may ignore the dummy samples but an uninterrupted sample stream will pass from the input to the RF IC first buffer to the output of the BB IC first buffer.

In another embodiment, in response to receiving the second command at step 230 the RF IC may also start 250 a second receive mode and subsequently start receiving another analog RF signal. In one example, the second receive mode may be a 2G receive mode and the associated analog RF signals may be 2G signals (for example, GSM signals). Then the RF IC converts 255 the analog RF signals received by the second receiver mode into a stream of digital data samples at another defined sample rate. The RF IC takes the initial digital sample of this stream at a predetermined time interval relative to the second command (for example, a second timing strobe). After sampling the analog RF signals, the RF IC collects 260 the stream of digital data samples in a second buffer. The RF IC places the initial digital sample of the stream at a predetermined time interval relative to the second command from step 230. Because the RF IC does not have a master clock, the RF IC performs these functions relative to the second command (for example, the second timing strobe) received from the BB IC.

As the stream of digital data samples is collected in the second buffer, the RF IC starts transmitting them from the second buffer to the BB IC 265 over the shared non-real time data interface in packets as a transport mechanism is available, interlaced with the packets from the first buffer.

The interlaced packets are received by the BB IC and their payload is inserted into the appropriate buffer based on packet header information. The dummy data samples are placed into the first buffer and the digital data samples from the second receive mode are placed into the second buffer as they arrive. The emptying of the first buffer continues at the original sampling rate as before while the second buffer is emptied at a rate required by the second modem.

In yet another embodiment, the RF IC stops the first receive mode in response to receiving the second command (for example, the second timing strobe) but does not start a second receive mode. Then, the RF IC starts the second receive mode in response to receiving another command after the second command.

While the RF IC places dummy data samples in the first buffer 240 and transmits 245 samples from the first buffer, it may receive a third command (for example, a third timing strobe) from the BB IC 270. In response to receiving the third command, the RF IC stops the second receive mode 273 (if the second receive mode was ON) and re-starts the first receive mode 275.

The RF IC again starts converting the analog RF signals received by the first receive into a second stream of digital data samples 285. The RF IC takes the initial data sample of the second stream at a first predetermined time interval relative to the third command (which may also be as well as at a second predetermined time interval relative to the first timing strobe).

After converting, when the first samples of the second stream are available, the input to the first buffer discontinues placing dummy data samples in the first buffer and starts placing the second stream of digital data samples in the first buffer 290 resuming the original sample rate and timing. Non-real time transmission of the samples from the first buffer to the BB IC 295 continues at a second rate as the transport mechanism is available. The data path is flushed of dummy data and normal receive is resumed at the original sample timing.

Thus, by transmitting dummy data samples during the time of discontinuous receive, the RF IC maintains timing with the BB IC including mitigating any time variation of a shared non-real time data interface. The RF IC sample timing does not have to be re-established because, by sending dummy data samples, it appears to the BB IC that the transmission of data for the first RAT is continuous and the transmission was never stopped for any duration of time.

Figure 3:
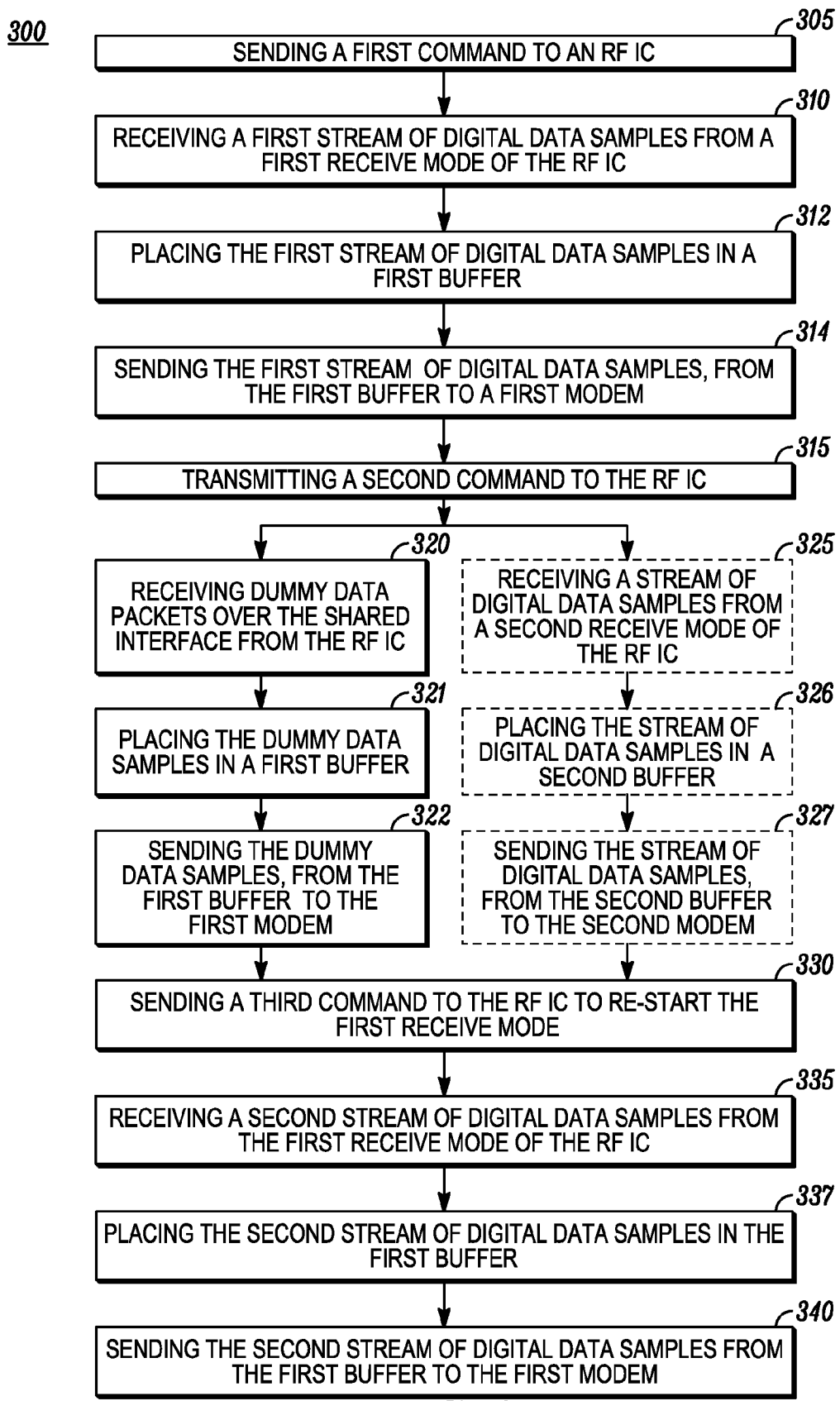
FIG. 3 is a flowchart of a method for a BB IC to maintain timing across discontinuous activity gaps in accordance with some embodiments.

FIG. 3 is a flowchart of a method 300 for a BB IC (such as BB IC 450 shown in FIG. 4) to maintain timing across discontinuous activity gaps. The method 300 starts with the BB IC sending a first command to the RF IC for initial synchronization 305. In one example, the first command may be a first timing strobe. In another example, the first command may be a number of commands.

Then the BB IC receives a first stream of digital data samples from the RF IC 310. The first stream of digital data samples is in the form of data packets and is received at a first rate from a first receive mode of the RF IC over the shared non-real time data interface (such as the 3G DigRF 430, 432 in FIG. 4). The data packets may contain a header that includes information about a RAT associated with the data packet.

Figure 4:
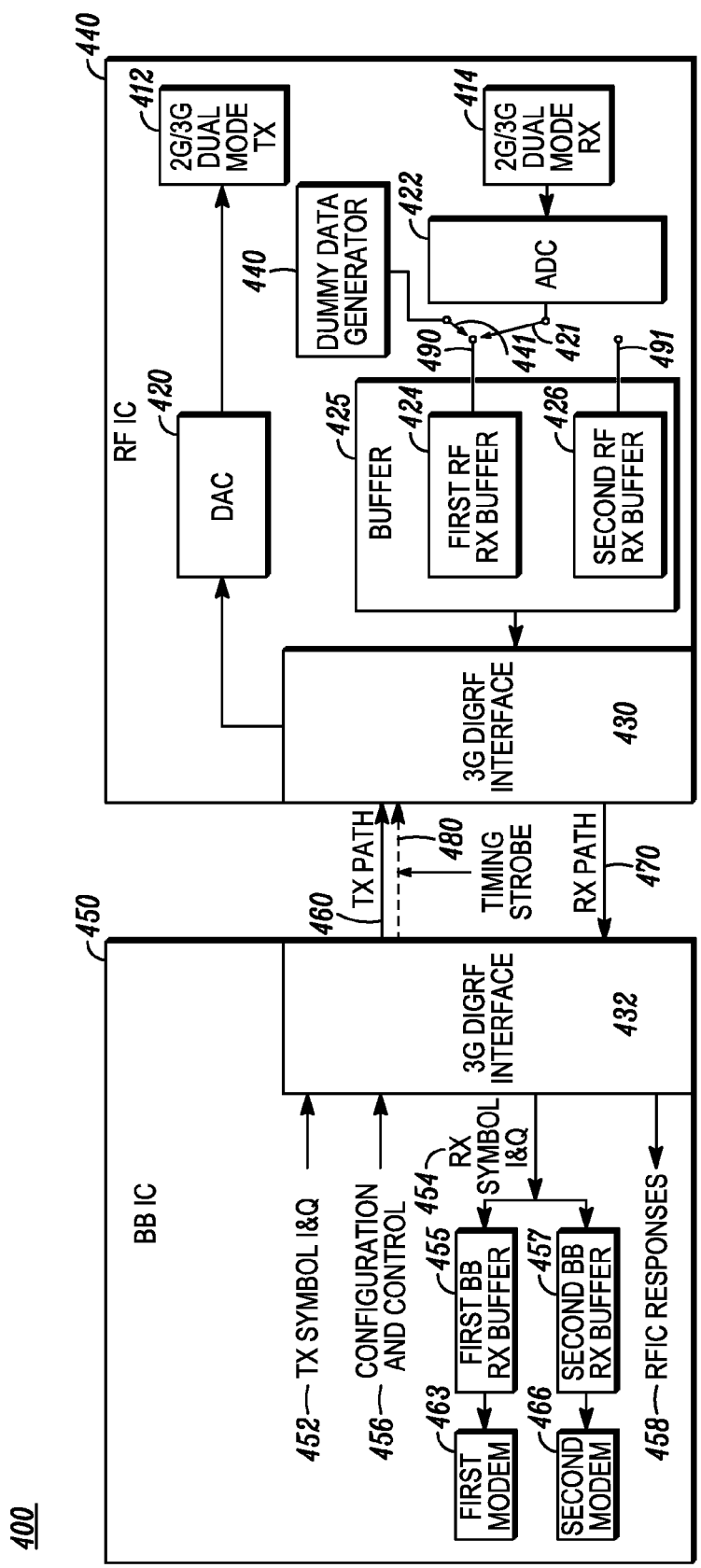
FIG. 4 is a block diagram of an RF IC including a dummy data generator in communication with a BB IC using a 3G DigRF interface in accordance with some embodiments.

The 2G/3G RX 414 shown of FIG. 4 may be configured in a first receive mode and the first stream of digital data samples may be associated with a first RAT (for example, a 3G RAT such as WCDMA). The BB IC starts placing the samples into a first buffer as they arrive 312, at a rate which is different from a defined sample rate at which the RF IC sampled the analog RF signals in step 215 (of FIG. 2). There may be different buffers for different signals (such as, a first buffer for 3G signals, a second buffer for 2G signals or two buffers for a single RAT when RX diversity is supported, and so on). In one example, these buffers may use a First In First Out (FIFO) scheme. In a FIFO scheme, the sample that is sent to the buffer first is the first sample to be transmitted from the buffer.

When the number of samples in the buffer reaches a threshold, the BB IC begins sending the received samples from the buffer to the 3G modem 314 at the defined sample rate at which the RF IC sampled the analog RF signals in step 215 (of FIG. 2). This buffer threshold may be defined by a manufacturer of the IC to ensure that the buffer does not under-flow or over-flow during normal operating conditions. While the input into this buffer may be bursty, the output is constant and continuous to keep the RF sampling and BB IC's sample consumption at a constant time offset.

Then the BB IC transmits a second command (for example, a second timing strobe) to the RF IC 315 to stop the first receive mode and starts receiving dummy data samples over the shared non-real time data interface from the RF IC 320. The dummy data samples can be received by the BB IC in a dummy data packet. In one case, the dummy data packet may include a number of dummy data samples. In another case, the dummy data packet may not include a number of dummy data samples but instead informs the BB IC to replace it with a pre-determined number of dummy data samples.

The dummy data packets are treated no differently when received in the BB IC and are placed into the first buffer 321 as they are received. Likewise, the buffer continues to be emptied at the defined sampling rate by sending the samples from the buffer to the 3G modem 322. The modem may ignore the dummy samples but an uninterrupted sample stream will pass from the input to the RF IC first buffer to the output of the BB IC first buffer.

In another embodiment, the BB IC may also receive a stream of digital data samples from the RF IC 325 interlaced with the dummy data packets. The stream of digital data samples is in the form of data packets and is received from a second receive mode of the RF IC over the shared non-real time data interface (such as 3G DigRF 430, 432 as shown in FIG. 4) at a second rate. The second receive mode may be a 2G RX receive mode as shown in FIG. 4, and the stream of digital data samples may be associated with a second RAT (for example, a 2G RAT such as GSM).

The interlaced packets are received by the BB IC and the packet payload is inserted into the appropriate buffer based on packet header information. The dummy data samples are placed into the first buffer 321 and the digital data samples from the second receive mode are placed into the second buffer 326 as they arrive. The BB IC sends the received samples from the second buffer to the 2G modem 327 at a rate required by the second modem.

While receiving the dummy data packets, the BB IC sends a third command (for example, a third timing strobe) to the RF IC to shut down the second receive mode (if applicable) and re-start the first receive mode 330. Packets containing samples from the second receive mode will stop once the RF IC's second RF RX buffer is empty. Next, the BB IC starts receiving a second stream of digital data samples from the first receive mode 335, over the shared non-real time data interface from the RF IC at the first rate. The transition from dummy samples back to real samples is transparent to the BB IC, the BB IC continues placing the samples into the first buffer as they arrive 337 bundled in packets, at a rate which is different from a defined sample rate at which the RF IC sampled the analog RF signals in step 215 (of FIG. 2) and keeps sending the samples from the first buffer to the first modem 340. The output of the BB IC first buffer will continue uninterrupted as the dummy samples are flushed through and received samples resume. In an alternate embodiment, sending one or more commands and/or a the third timing strobe stops the second receive mode in the RF IC and one or more commands and/or a fourth timing strobe re-starts the first receive mode.

Therefore, the BB IC receives dummy data samples during the time of discontinuous receive of the RF IC. As a result, the RF IC does not have to re-acquire timing because it appears to the BB IC that the transmission of data for the first RAT is continuous and the transmission was never stopped for any duration of time.

FIG. 4 is a block diagram 400 of an RF IC including a dummy data generator in communication with a BB IC using a 3G DigRF interface. In order to implement the placement of dummy data in accordance with FIGS. 2 and 3, a dummy data generator 440, a first switch 421, and a second switch 441 are added to FIG. 1. Other elements of FIG. 4 are equivalent to the corresponding elements of FIG. 1. The functionality of an RF IC 410, a 2G/3G dual-mode TX 412, a 2G/3G dual-mode RX 414, a digital to analog converter (DAC) 420, an analog to digital converter (ADC) 422, a buffer 425 including a first RF RX buffer 424 and a second RF RX buffer 426, a 3G DigRF interface 430, 432, a BB IC 450, TX symbols I&Q signals 452, configuration and control signals 456, RX symbols I&Q signals 454, RF IC responses 458, a first BB RX buffer 455, a second BB RX buffer 457, a first modem 463, a second modem 466, a TX PATH 460, an RX PATH 470, and an optional timing strobe 480 is similar to the functionality of the RF IC 110, the 2G/3G dual-mode TX 112, the 2G/3G dual-mode RX 114, the digital to analog converter (DAC) 120, the analog to digital converter (ADC) 122, the buffer 125 including the first RF RX buffer 124 and the second RF RX buffer 126, the 3G DigRF interface 130, 132, the BB IC 150, the TX symbols I&Q signals 152, the configuration and control signals 156, the RX symbols I&Q signals 154, the RF IC responses 158, the first BB RX buffer 155, the second BB RX buffer 157, the first modem 163, the second modem 166, the TX PATH 160, the RX PATH 170, and the optional timing strobe 180, respectively.

In FIG. 4, during a first receive mode such as a 3G RAT receive mode, the first switch 421 is coupled to the first RF RX buffer 424 and the second switch 441 is not connected (or is coupled to ground). When in this configuration, the 2G/3G dual-mode receiver 414 is in 3G receive mode, the received 3G signal is digitized by the ADC 422, and a first stream of digital data samples is collected in the first RF RX buffer 424. The RF IC 410 can then send samples from the buffer 425 to the BB IC 450 over the 3G DigRF interface 430, 432. It is assumed that the second RF RX buffer 426 is empty; however, if the second RF RX buffer 426 had data from a prior second receive mode such as a 2G RAT receive mode, the second RF RX buffer 426 contents would be emptied through interlacing of the second RF RX buffer 426 contents with the first RF RX buffer 424 contents. When the second RF RX buffer 426 is empty, then the second RF RX buffer would be inactive until it starts to get filled from the ADC 422.

During a discontinuous activity gap such as occurs during a 3G discontinuous receive mode, the first switch 421 is not connected (or is coupled to ground) and the second switch 441 is coupled to the first RF RX buffer 424. In this scenario, no data is available at the ADC 422 from the 2G/3G dual-mode RX 414. In other words, in this case there is no data available from any RAT (for example, 3G and 2G RAT). Instead of losing timing across the 3G DigRF interface due to the absence of samples through the interface 430, 432, the dummy data generator 440 generates and sends dummy data samples to the first RF RX buffer 424.

Figure 5:
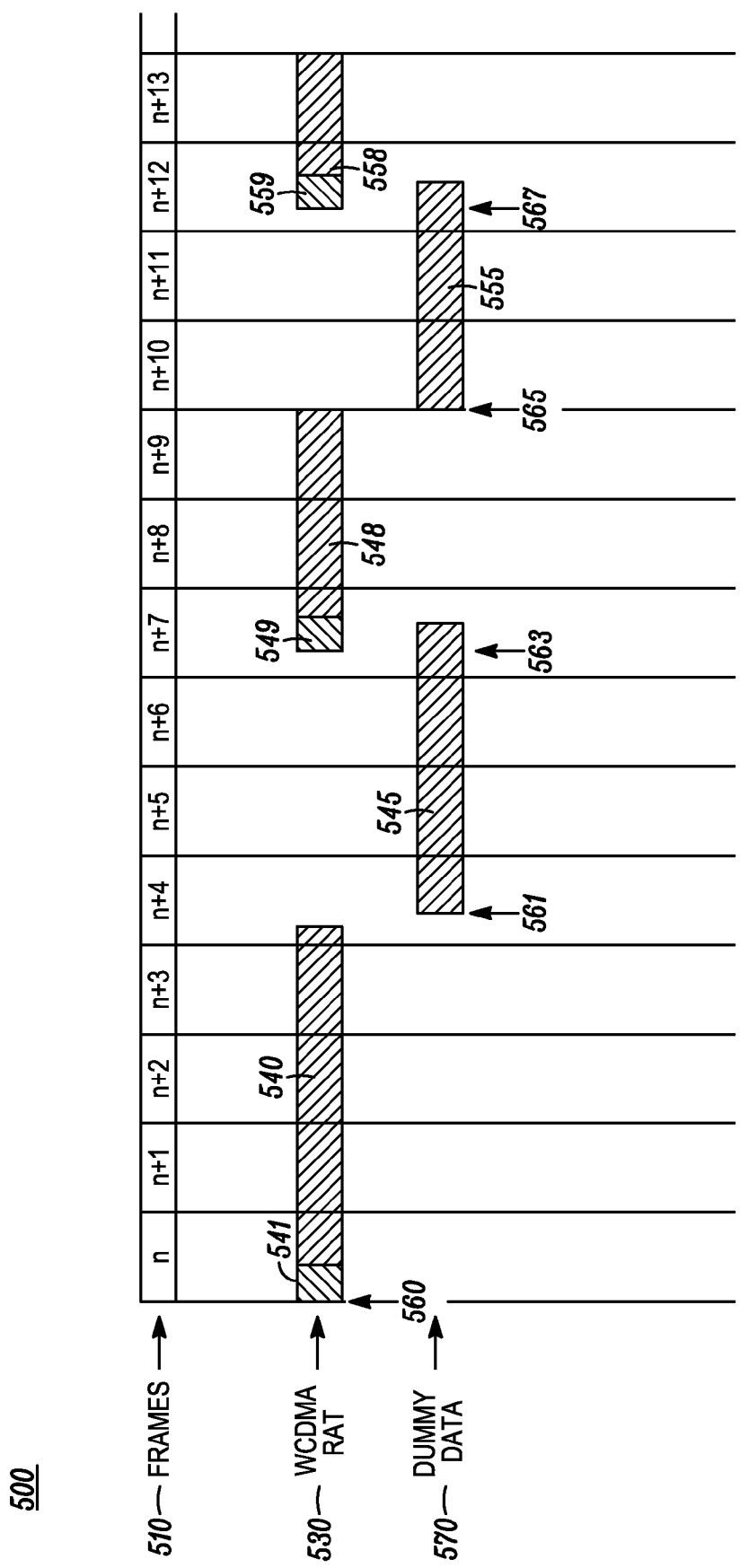
FIG. 5 is an example of transmission of samples from the RF IC to the BB IC during discontinuous receive gaps in accordance with some embodiments.

The dummy data samples allow the RF IC 410 to maintain timing with the BB IC 450 across the non-real time 3G DigRF data interface 430, 432. As the dummy data samples are collected in the first RF RX buffer 424, the RF IC 410 starts transmitting the samples from the first RF RX buffer 424 to the BB IC 450 over the 3G DigRF interface 430, 432. If the discontinuous receive mode occurs immediately following the 3G RAT receive mode, it is most likely that the second RF RX buffer 426 is already inactive. FIG. 5 is an example of transmission of samples from the RF IC to the BB IC during discontinuous receive gaps in accordance with some embodiments and will be described in detail later.

During discontinuous activity gaps of a 3G discontinuous receive mode, the 2G/3G dual-mode receiver 414 can switch to a second receive mode such as a 2G RAT receive mode. In this situation, the first switch 421 is coupled to input 491 of the second RF RX buffer 426. In order to maintain timing of the 3G data stream during this discontinuous activity gap over the non-real time 3G DigRF data interface, the second switch 441 couples the dummy data generator 440 to the input 490 of the first RF RX buffer 424. Thus, the ADC 422 sends digitized 2G receive mode signals to the second RF RX buffer 426 and the dummy data generator sends dummy data samples to the first RF RX buffer 424.

Figure 6:
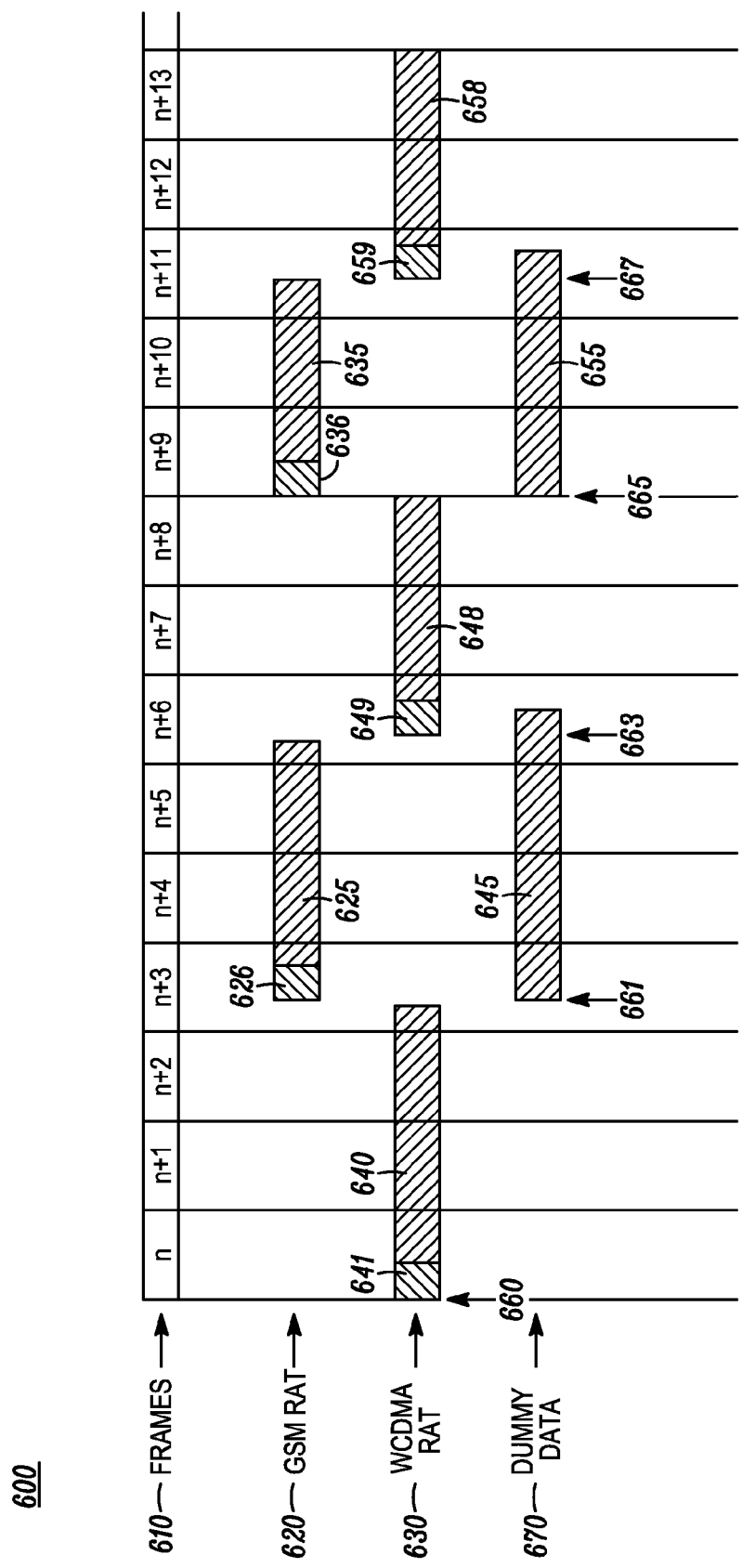
FIG. 6 is an example of transmission of samples from the RF IC to the BB IC while switching from one RAT to another RAT during discontinuous receive gaps in accordance with some embodiments.

Because both buffers 424, 426 are being filled, both buffers 424, 426 will be emptied through the 3G DigRF interface 430, 432 to the BB IC 450. This leads to the transmission of interlaced packets of the second RAT (for example, GSM RAT) received from the 2G/3G dual-mode RX 414 with the dummy data packets generated by the dummy data generator 440. FIG. 6 is an example of transmission of samples from the RF IC to the BB IC while switching from one RAT to another RAT during discontinuous receive gaps in accordance with some embodiments and will be described in detail later.

Therefore, the dummy data generator 440 generates and transmits dummy data samples during the intervals of discontinuous activity gaps. As a result, the RF IC 410 maintains timing with the BB IC 450 including mitigating any time variation of a shared non-real time data interface. The RF IC sample timing does not have to be re-established after a discontinuous activity gap because, by sending dummy data samples, it appears to the BB IC that the transmission of data for the first RAT is continuous and the transmission was never stopped for any duration of time.

FIG. 5 is an example 500 of transmission of samples from the RF IC to the BB IC during discontinuous receive gaps. The samples or packets are transmitted from the RF IC to the BB IC in frames 510. FIG. 5 shows a series of consecutive frames (n, n+1, n+2 . . . ) 510 and a first stream of data samples 540 of a 3G (for example, WCDMA) RAT 530 being transmitted from the RF IC to the BB IC. This is equivalent to the example of FIG. 4, when the first switch 421 is at position 490 and the second switch 441 is not connected (or is connected to ground). It is understood that before transmitting, the RF IC turns ON the first receive mode of the single receiver 2G/3G RX 414, as shown in FIG. 4 in response to a first command (for example, a first timing strobe) 560, receives the analog RF signals associated with the WCDMA RAT, converts them into a stream of digital data samples, stores them in a first buffer, and then transmits the samples as packets from the buffer in consecutive frames to the BB IC. The RF IC requires a period of time to turn on, tune and settle 541 the new receive mode prior to delivering valid data samples.

Then in response to receiving a second command (for example, a second timing strobe) 561 from the BB IC, the RF IC initiates timing sample timing maintenance, stops the first receive mode and starts placing dummy data samples 570 in the first buffer. This is equivalent to the example of FIG. 4, when the first switch 421 is not at position 490 or 491 (or is coupled to ground) and the second switch 441 is at position 490. Then the RF IC starts transmitting the dummy samples/ packets 545 from the first buffer to the BB IC. Therefore, it appears as if the data transmission never stopped for the first RAT. The timing strobes do not need to coincide with the frame boundaries.

In response to receiving a third command (for example, another timing strobe) 563 from the BB IC, the RF IC turns on, tunes and settles the receiver 549 in the new mode while continuing to transmit dummy data samples 545. Once the receiver has settled, the ADC resumes sampling at the same timing that dummy samples have been generated and then the RF IC again starts transmitting a second stream of digital data samples 548 associated with the WCDMA RAT 530. This is equivalent to the example of FIG. 4, when the first switch 421 is at position 490 and the second switch 441 is disconnected (or connected to ground).

In response to receiving another command (for example, another timing strobe) 565 from the BB IC, the RF IC stops the first receive mode and starts placing dummy data samples 570 in the first buffer. This is again equivalent to the example of FIG. 4, when the first switch 421 is not at position 490 or 491 and the second switch 441 is at position 490. Then the dummy samples succeed the received samples in the first RF RC buffer 424 and the RF IC 410 eventually starts transmitting the dummy data samples 555 from the first buffer to the BB IC. Again, the RF IC receives another commands (for example, another timing strobe 567), and in response, the RF IC turns on again and tunes and settles the receiver 559 in the new mode while continuing to transmit dummy data samples 555. Once settled, the dummy sample generation is turned off and the RF IC again starts transmitting a second stream of digital data samples 558 associated with the WCDMA RAT 530. This is again equivalent to the example of FIG. 4, when the first switch 421 is at position 490 and the second switch 441 is not coupled to the buffer 425 (or is coupled to ground).

Similarly, whenever the RF IC stops the first receive mode and enters a discontinuous receive gap, it starts placing dummy data samples in the buffer and then transmits them to the BB IC.

Therefore, the RF IC does not have to re-acquire timing because by sending dummy data samples, it appears that the transmission of data for the first RAT is continuous (540, 545, 548, 555, 558) and the transmission was never stopped for any duration of time. Therefore, by transmitting dummy data samples during the time of discontinuous receive (i.e., the time between the first stream 540 and the second stream 548), the RF IC 410 maintains timing synchronization with the BB IC 450.

FIG. 6 is an example 600 of transmission of samples from the RF IC to the BB IC while switching from one RAT to another RAT. In the examples, the samples or packets are transmitted from the RF IC to the BB IC in frames. FIG. 6 shows a series of consecutive frames (n, n+1, n+2 . . . ) 610 and a first stream of data samples 640 of an active 3G (for example, WCDMA) RAT 630 being transmitted from the RF IC to the BB IC. It is understood that before transmitting, the RF IC turns ON the first receive mode of the single receiver 2G/3G dual-mode RX 414, as shown in FIG. 4 in response to a first command (for example. a first timing strobe) 660, receives the analog RF signals associated with the WCDMA RAT, converts them into a stream of digital data samples, stores them in a first buffer, and then transmits the samples as packets from the first buffer in consecutive frames to the BB IC. This is equivalent to the example of FIG. 4, when the first switch 421 is at position 490 and the second switch 441 is disconnected (or connected to ground). The RF IC requires a period of time to turn on, tune and settle 641 for each mode prior to delivering valid RF samples.

Then in response to receiving another command (for example, another timing strobe) 661 from the BB IC, the RF IC initiates timing sample timing maintenance, stops the first receive mode and starts placing dummy data samples 670 in the first buffer. This is accomplished by disconnecting the first switch 421 from the first RF RX buffer input node 490 and connecting the second switch 441 to the first RF RX buffer input node 490. Eventually the RF IC starts transmitting the dummy samples/packets 645 from the first buffer to the BB IC. Therefore, it appears to the BB IC as if the data transmission never stopped for the first RAT.

While transmitting the dummy data samples 645 to maintain timing of the WCDMA transmission, the RF IC also turns on, tunes and settles the receiver 626 in the new mode before it starts transmitting another stream of digital data samples 625 associated with the second RAT (for example, GSM RAT 620). This is equivalent to the example of FIG. 4, when the first switch 421 is at position 491 (and the second switch 441 is still at position 490). It is understood that before transmitting, the RF IC turns ON the second receive mode (for example, the 2G/3G dual-mode RX 414 shown in FIG. 4 may be configured in a GSM mode in response to the one or more commands and/or a second timing strobe 661), receives the analog RF signals associated with the GSM RAT, converts them into a stream of digital data samples, stores them in a second buffer, and then transmits the samples as packets from the second buffer to the BB IC.

Then the RF IC receives another command (for example, another timing strobe) 663 from the BB IC, and in response, the RF IC stops the second receive mode and re-starts the first receive mode while continuing to transmit dummy data samples 645. As it restarts, the RF IC first turns on, tunes and settles the receiver 649 in the new mode. Once the receiver has settled, the ADC resumes sampling at the same timing that dummy samples have been generated, the generation of dummy samples is terminated and replaced by received samples and then the RF IC starts transmitting a second stream of digital data samples 648 associated with the WCDMA RAT 630. This is equivalent to the example of FIG. 4, when the first switch 421 is at position 490 and the second switch 441 is disconnected (or connected to ground). Then in response to receiving another command (for example, another timing strobe) 665 from the BB IC, the RF IC again stops the first receive mode and starts placing dummy data samples 670 in the first buffer. Then the RF IC starts transmitting the dummy samples 655 from the first buffer to the BB IC. While transmitting the dummy data samples, the RF IC turns on, tunes and settles the receiver 636 in the new mode and then starts transmitting another stream of digital data samples 635 associated with the second RAT (for example, GSM RAT 620). This is again equivalent to the example of FIG. 4, when the first switch 421 is at position 491 and the second switch 441 is at position 490. Then the RF IC receives another command 667 from the BB IC and in response the RF IC stops the second receive mode and re-starts the first receive mode. The RF IC turns on, tunes and settles the receiver 659 in the new mode while continuing to transmit dummy data samples 655. Once the receiver has settled, the ADC resumes sampling at the same timing that dummy samples have been generated and then the RF IC again starts transmitting a second stream of digital data samples 658 associated with the WCDMA RAT 630. This is again equivalent to the example of FIG. 4, when the first switch 421 is at position 490 and the second switch 441 is disconnected (or connected to ground).

Similarly, whenever the RF IC stops the first receive mode, it starts placing dummy data samples in the buffer and then transmits them in packets to the BB IC interlaced with the packets of data associated with the second RAT. The RF IC transmits these using the same criteria regardless whether they contain received or dummy samples.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for maintaining timing across discontinuous activity gaps for a non-real time data interface, in a radio frequency (RF) IC, the method comprising:
   starting a first receive mode in the RF IC in response to receiving a first command from a base band (BB) IC;
   converting analog RF signals received by the first receive mode into a first stream of digital data samples at a defined sample rate;
   collecting the first stream of digital data samples in a first buffer;
   transmitting samples from the first buffer over the non-real time data interface to the BB IC at a first rate different from the defined sample rate as a transport mechanism is available;
   stopping the first receive mode in response to receiving a second command from the BB IC;
   placing dummy data samples in the first buffer, after the first stream of digital data samples, wherein the dummy data samples are placed at the defined sample rate;
   continuing to transmit the samples from the first buffer to the BB IC at the first rate as the transport mechanism is available, wherein the samples include the dummy data samples;
   re-starting the first receive mode in response to receiving a third command from the BB IC;
   converting analog RF signals received by the first receive mode into a second stream of digital data samples at the defined sample rate;
   discontinuing placing the dummy data samples in the first buffer in response to re-starting the first receive mode;
   starting to place the second stream of digital data samples in the first buffer after the dummy data samples; and
   continuing to transmit the samples from the first buffer to the BB IC at a second rate different from the defined sample rate as the transport mechanism is available.

2. The method of claim 1, wherein transmitting the first command synchronizes timing between the RF IC and the BB IC.

3. The method of claim 1, wherein the samples are transmitted in packets.

4. The method of claim 3, wherein the dummy data samples are transmitted as a dummy data packet.

5. The method of claim 4, wherein the dummy data packet informs the BB IC to replace the dummy data packet with a pre-determined number of dummy data samples.

6. The method of claim 3, wherein transmitting samples further comprises:
   collecting multiple digital data samples into packets; and
   adding the packets into a queue of packets waiting to be sent to the BB IC.

7. The method of claim 1, wherein the first receive mode receives analog RF signals of a first RAT (radio access technology).

8. The method of claim 1, further comprising:
   starting a second receive mode in the RF IC in response to receiving the second command from the BB IC;
   converting analog RF signals received by the second receive mode into a stream of digital data samples at another defined sample rate;
   collecting the stream of digital data samples in a second buffer;
   transmitting samples from the second buffer over the non-real time data interface to the BB IC as the transport mechanism is available, interlaced with the samples from the first buffer; and stopping the second receive mode in response to receiving the third command from the BB IC.

9. The method of claim 8, wherein the second receive mode receives analog RF signals of a second RAT (radio access technology).

10. The method of claim 1, wherein the first buffer is filled to a threshold before transmitting samples.

11. The method of claim 1, wherein the dummy data samples comprise digital data having a NULL value.

12. A method for maintaining timing across discontinuous activity gaps for a non-real time data interface, in a base band (BB) IC, the method comprising:
sending a first command to a radio frequency (RF) IC for initial synchronization;
receiving a first stream of digital data samples, in data packets from a first receive mode over the non-real time data interface from the RF IC at a first rate;
placing the first stream of digital data samples in a first buffer, as they are received;
sending the first stream of digital data samples from the first buffer to a first modem at a rate different from the first rate;
transmitting a second command to the RF IC to stop the first receive mode;
receiving dummy data samples in a dummy data packets over the non-real time data interface from the RF IC;
placing the dummy data samples in the first buffer;
sending the dummy data samples from the first buffer to the first modem at a rate different from the first rate;
sending a third command to the RF IC to re-start the first receive mode;
receiving a second stream of digital data samples, in data packets, from the first receive mode over the non-real time data interface from the RF IC at the first rate, after a first predefined time interval relative to the third command;
placing the second stream of digital data samples in the first buffer; and
sending the second stream of digital data samples from the first buffer to the first modem at a rate different from the first rate.

13. The method of claim 12, wherein the dummy data packets includes a plurality of dummy samples.

14. The method of claim 12, wherein the dummy data packets informs the BB IC to replace the dummy data packets with a pre-determined number of dummy data samples.

15. The method of claim 12, wherein each data packet includes a header that contains information about a RAT (radio access technology) associated with the data packet.

16. The method of claim 12, wherein the first stream of digital data samples are associated with a first RAT (radio access technology).

17. The method of claim 12 further comprising:
receiving a stream of digital data samples, in data packets, from a second receive mode over the non-real time data interface from the RF IC at a second rate, interlaced with the dummy data packets containing the dummy data samples;
placing the stream of digital data samples in a second buffer; and
sending the second stream of digital data samples from the second buffer to a second modem at a rate different from the second rate.

18. The method of claim 17, wherein the stream of digital data samples are associated with a second RAT (radio access technology).

19. The method of claim 17, wherein transmitting the second command further comprises:
starting the second receive mode.

20. The method of claim 17, wherein sending the third command further comprises:
stopping the second receive mode.

* * * * *